(12) United States Patent
Huang (10) Patent No.: US 11,629,770 B2
(45) Date of Patent: Apr. 18, 2023

(54) SUPPORTING DEVICE AND GAS SPRING

(71) Applicant: Ming-Hsien Huang, New Taipei (TW)

(72) Inventor: Ming-Hsien Huang, New Taipei (TW)

( * ) Notice: Subject to any disclaimer, the term of this patent is extended or adjusted under 35 U.S.C. 154(b) by 511 days.

(21) Appl. No.: 16/874,696

(22) Filed: May 15, 2020

(65) Prior Publication Data
US 2021/0199170 A1    Jul. 1, 2021

(30) Foreign Application Priority Data

Dec. 31, 2019   (TW) .................................. 108217548

(51) Int. Cl.
*F16F 9/02*     (2006.01)
*F16C 32/06*    (2006.01)
*F16F 15/02*    (2006.01)
*F16F 15/023*   (2006.01)
*F16F 9/54*     (2006.01)

(52) U.S. Cl.
CPC ........ *F16F 9/0245* (2013.01); *F16C 32/0603* (2013.01); *F16F 9/54* (2013.01); *F16F 15/022* (2013.01); *F16F 15/0232* (2013.01); *F16M 2200/06* (2013.01)

(58) Field of Classification Search
CPC .................................................. F16F 9/0245
See application file for complete search history.

(56) References Cited

U.S. PATENT DOCUMENTS 4,621,786 A * 11/1986 Greenlee ............ F16M 11/2021
                                                   396/419
4,685,649 A *  8/1987 McKay ................... F16M 11/24
                                                   352/243
5,253,832 A * 10/1993 Bolas .................. F16M 11/2064
                                                   248/123.11
7,137,747 B2 * 11/2006 Chapman ............... F16M 11/42
                                                   396/428
7,311,036 B2    12/2007 Uchino

FOREIGN PATENT DOCUMENTS

| | | | |
|---|---|---|---|
| CH |   669248 A5 * |  2/1989 | |
| CN | 108741846     | 11/2018 | |
| DE |  19742050 A1 * |  3/1999 | ............. F16M 11/04 |
| FR |   2870317 A1 * | 11/2005 | ............. F16M 11/04 |
| GB |   2196755 A  * |  5/1988 | ............. F16M 11/10 |
| TW |    M395750    |  1/2011 | |

* cited by examiner

*Primary Examiner* — Melody M Burch
(74) *Attorney, Agent, or Firm* — JCIPRNET (57) ABSTRACT

A supporting device including an installation assembly; a first supporting arm assembly having a longitudinal direction, a first end, and a second end; a switching bracket; a bearing unit pivotally connected to the switching bracket; and at least one gas spring is provided. The first end is pivotally connected to the installation assembly. The switching bracket is pivotally connected to the second end of the first supporting arm assembly. The gas spring is disposed in the first supporting arm assembly and is respectively connected to the switching bracket and the installation assembly to provide a supporting force. Each gas spring has a hollow tube, a piston rod, and a compression spring. The piston rod is slidably disposed through the hollow tube and has a head. The head may be varied between maximum and minimum protruding positions relative to the hollow tube. The compression spring is sleeved on the piston rod.

20 Claims, 13 Drawing Sheets

SUPPORTING DEVICE AND GAS SPRING

CROSS-REFERENCE TO RELATED APPLICATION

This application claims the priority benefit of Taiwan patent application serial no. 108217548, filed on Dec. 31, 2019. The entirety of the above-mentioned patent application is hereby incorporated by reference herein and made a part of this specification.

BACKGROUND

Technical Field

The disclosure relates to a supporting device, and in particular, a supporting device combined with a gas spring.

Description of Related Art

The force provided by the gas spring of existing technology is limited by the size of the hollow tube in the gas spring, that is, the internal volume of the hollow tube determines the amount of gas which can be filled. In the case where other conditions are the same, the larger the volume of the hollow tube, the greater the reaction force (force of compression or extension) which can be provided. The gas spring may be used as a source of supporting force for the supporting mechanism of the display. However, in recent years, as the supporting mechanism of the display has become lighter and thinner, it is usually only possible to adopt a gas spring of a smaller volume and a smaller reaction force, causing the load capacity to be limited, which is not conducive to the support application of the supporting mechanism, so defects exist.

Therefore, how to increase the reaction force without increasing the volume of the gas spring such that the supporting mechanism has miniaturization characteristic and improved load capacity has become an important improvement goal.

SUMMARY

The disclosure provides a supporting device capable of increasing the load capacity thereof without increasing the volume of the gas spring and has the advantage of size miniaturization.

A supporting device of the disclosure includes an installation assembly, a first supporting arm assembly, a switching bracket, a bearing unit, and at least one gas spring. The installation assembly is disposed on a reference plane. The first supporting arm assembly has a first longitudinal direction, a first end, and a second end. The first end is pivotally connected to the installation assembly. The switching bracket is pivotally connected to the second end of the first supporting arm assembly. The bearing unit is pivotally connected to the switching bracket for bearing an object. At least one gas spring is disposed in the first supporting arm assembly and is respectively connected to the switching bracket and the installation assembly to provide a supporting force. Each of the at least one gas spring includes a hollow tube, a piston rod, and a compression spring. The piston rod is slidably disposed through the hollow tube and has a head. The head may be varied between a maximum protruding position and a minimum protruding position relative to the hollow tube. As such, a variable movement space may be defined between the head relative to the hollow tube. The compression spring is sleeved on the piston rod.

The first end of the first supporting arm assembly is rotated relative to the installation assembly and is adapted to move between a first location and a second location. When the first supporting arm assembly moves to the first location, the first longitudinal direction is parallel to a gravitational direction and the deformation of the compression spring is minimum. When the first supporting arm assembly moves to the second location, the first longitudinal direction is perpendicular to the gravitational direction and the deformation of the compression spring is maximum. The bearing unit is adapted to rotate relative to the switching bracket.

A gas spring of the disclosure includes a hollow tube, a piston rod, and a compression spring. The piston rod is slidably disposed through the hollow tube and has a head. The head may be varied between a maximum protruding position and a minimum protruding position relative to the hollow tube. As such, a variable movement space may be defined between the head relative to the hollow tube. The compression spring is sleeved on the piston rod. The head may be varied between a maximum protruding position and a minimum protruding position relative to the hollow tube. As such, the variable movement space may be defined between the head and the hollow tube. The compression spring is sleeved on the piston rod to provide an elastic force.

Based on the above, the supporting device of the disclosure is combined with the gas spring as a source of supporting force for the first supporting arm assembly. The gas spring also has the compression spring which may provide the elastic force to the piston rod, thereby increasing the pressure value of the gas spring. Therefore, the supporting device of the disclosure can increase the load capacity thereof without increasing the volume of the gas spring and has the advantage of size miniaturization.

To make the aforementioned and other features of the disclosure more comprehensible, several embodiments accompanied with drawings are described in detail as follows.

DETAILED DESCRIPTION OF DISCLOSED EMBODIMENTS

Figure 1A:
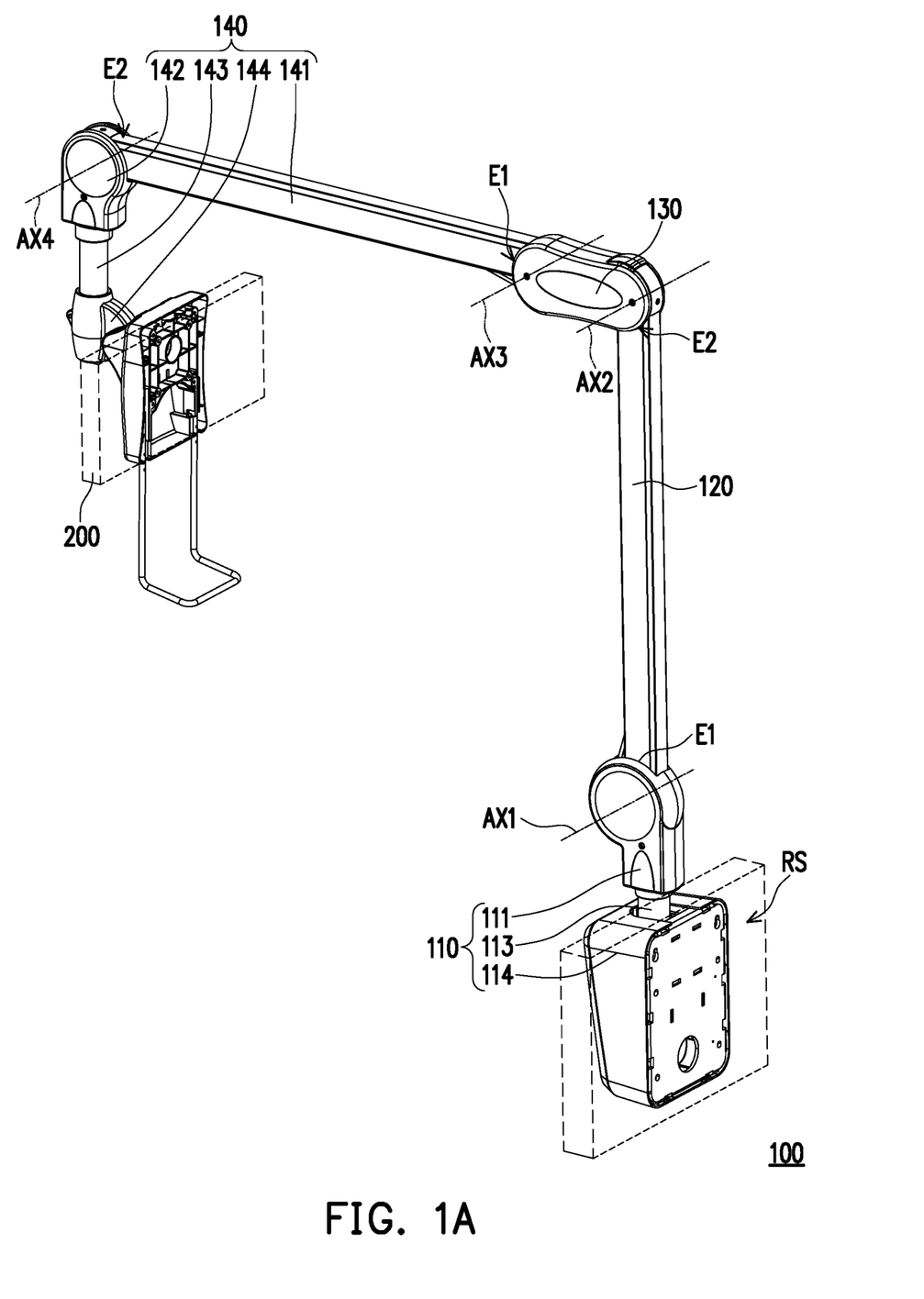
FIG. 1A is a perspective view of a supporting device of the disclosure.
Figure 1B:
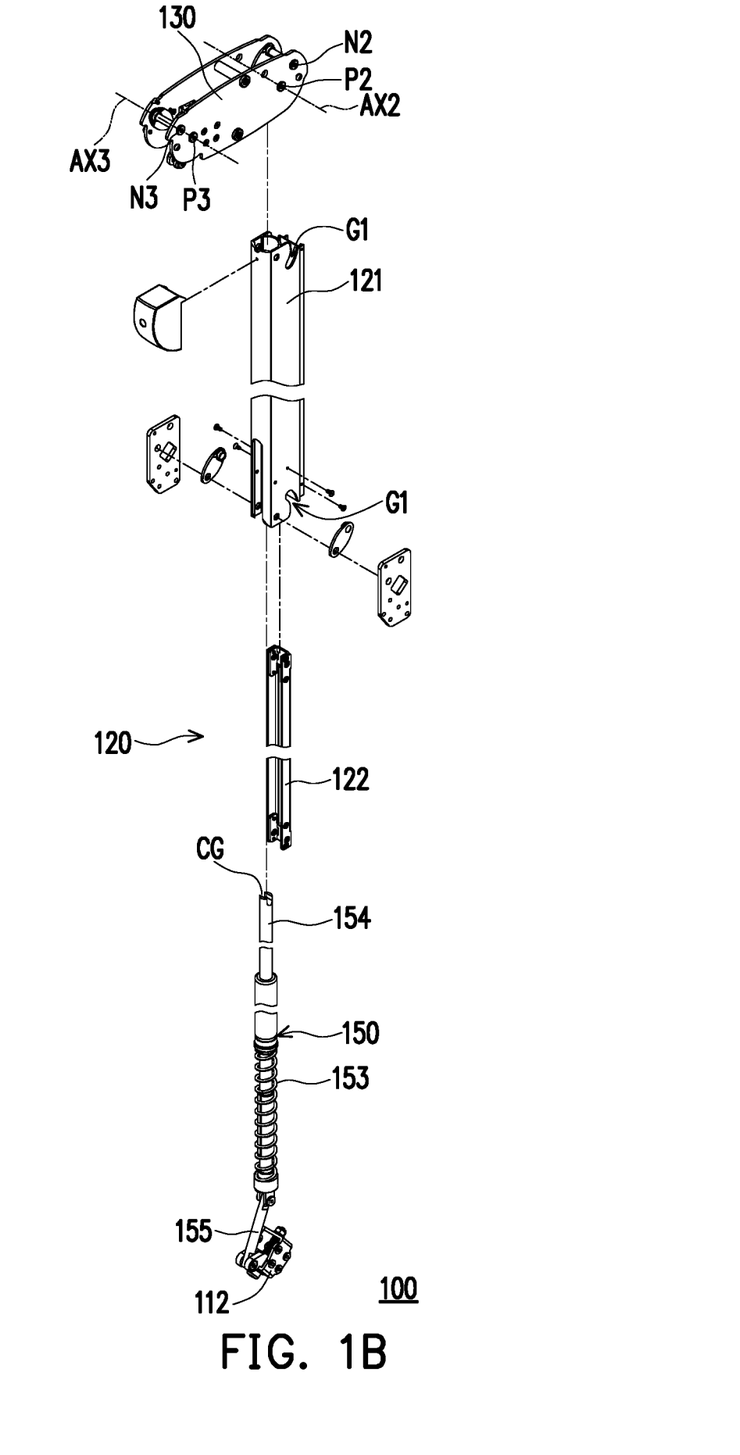
FIG. 1B is an exploded view of a first supporting arm assembly, an installation assembly, a gas spring, and a switching bracket of the supporting device of FIG. 1A.
Figure 1C:
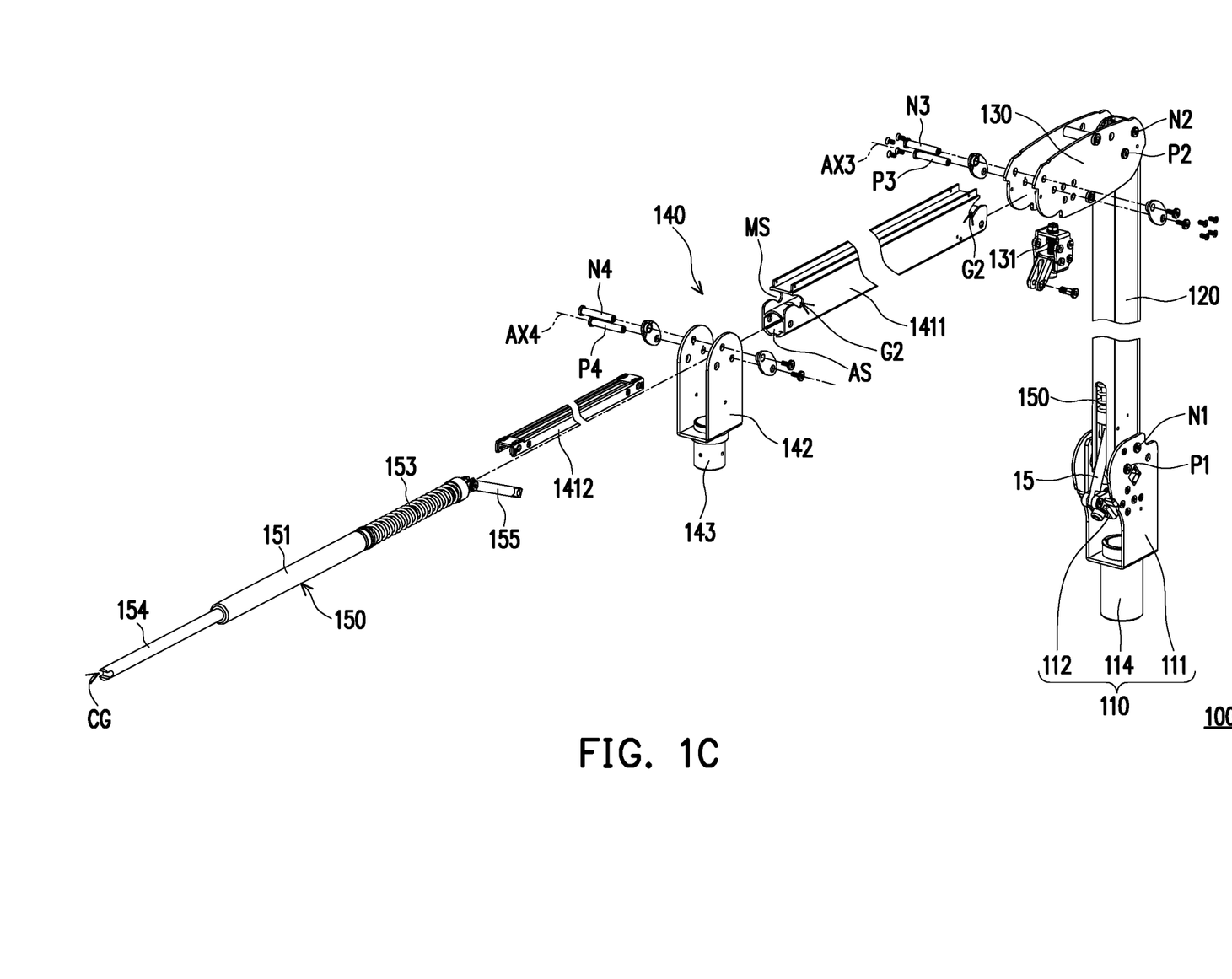
FIG. 1C is an exploded view of a bearing unit, the switching bracket, and the first supporting arm assembly of the supporting device of FIG. 1A.

FIG. 1A is a perspective view of a supporting device of the disclosure. FIG. 1B is an exploded view of a first supporting arm assembly, an installation assembly, a gas spring, and a switching bracket of the supporting device of FIG. 1A. FIG. 1C is an exploded view of a bearing unit, the switching bracket, and the first supporting arm assembly of the supporting device of FIG. 1A.

Please refer to FIG. 1A. A supporting device 100 of the embodiment is used to carry an object 200, such as a display screen, a touch panel, or other similar electronic elements. The supporting device 100 includes an installation assembly 110, a first supporting arm assembly 120, a switching bracket 130, a bearing unit 140, and at least one gas spring 150.

The installation assembly 110 is disposed on a reference plane RS. In the embodiment, the reference plane RS is, for example, a wall surface or a plane. The first supporting arm assembly 120 has a first end E1 and a second end E2. The first end E1 of the first supporting arm assembly 120 is pivotally connected to the installation assembly 110, meaning that the first supporting arm assembly 120 may be pivotally rotated relative to the installation assembly 110 with a first axis AX1 as the center.

The first end E1 of the first supporting arm assembly 120 is rotated relative to the installation assembly 110 and is adapted to move between a first location L1 and a second location L2, thereby adjusting the object 200 to move relatively away from or close to the reference plane RS.

The switching bracket 130 is pivotally connected to the second end E2 of the first supporting arm assembly 120, meaning that the switching bracket 130 may be pivotally rotated relative to the first supporting arm assembly 120 with a second axis AX2 as the center. The bearing unit 140 is pivotally connected to the switching bracket 130 for bearing the object 200, meaning that the bearing unit 140 may be pivotally rotated relative to the switching bracket 130 with a third axis AX3 as the center. The bearing unit 140 is adapted to rotate relative to the switching bracket 130 to be perpendicular or parallel to the first supporting arm assembly 120. The bearing unit 140 is rotated relative to the switching bracket 130.

The gas spring 150 is disposed in the first supporting arm assembly 120 and is respectively connected to the switching bracket 130 and the installation assembly 110 to provide a supporting force. The gas spring 150 includes a hollow tube 151, a piston rod 152, and a compression spring 153. The hollow tube 151 has an internal space for filling gas. The piston rod 152 is slidably disposed in the internal space of the hollow tube 151. The gas in the internal space supports the piston rod 152 to form a predetermined pressure value of the gas spring 150. The compression spring 153 is sleeved on the piston rod 152 and is adapted to provide an elastic force, thereby increasing the maximum pressure value of the gas spring 150.

Figure 2A:
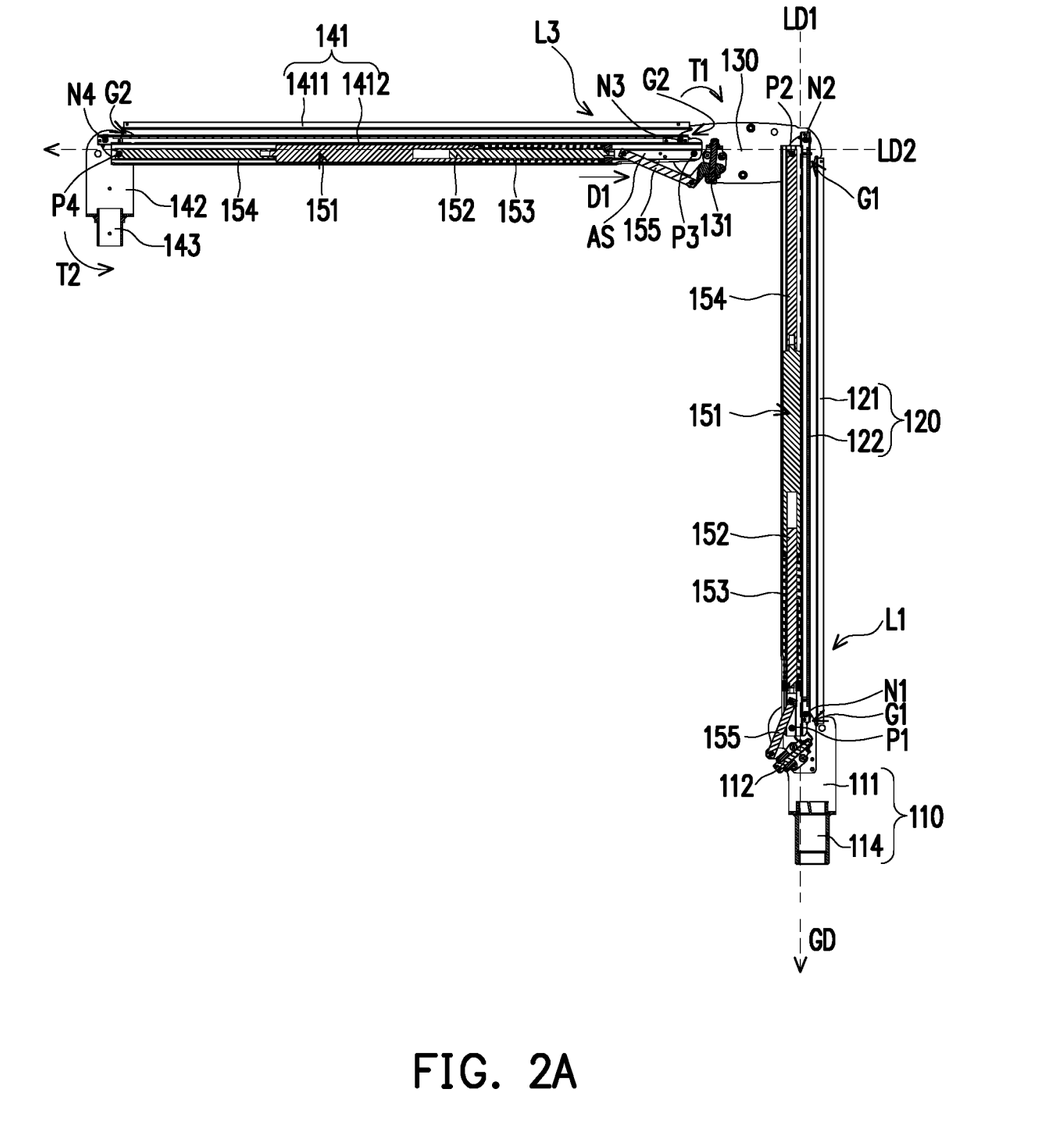
FIG. 2A is a cross-sectional view of the supporting device of FIG. 1A.
Figure 2B:
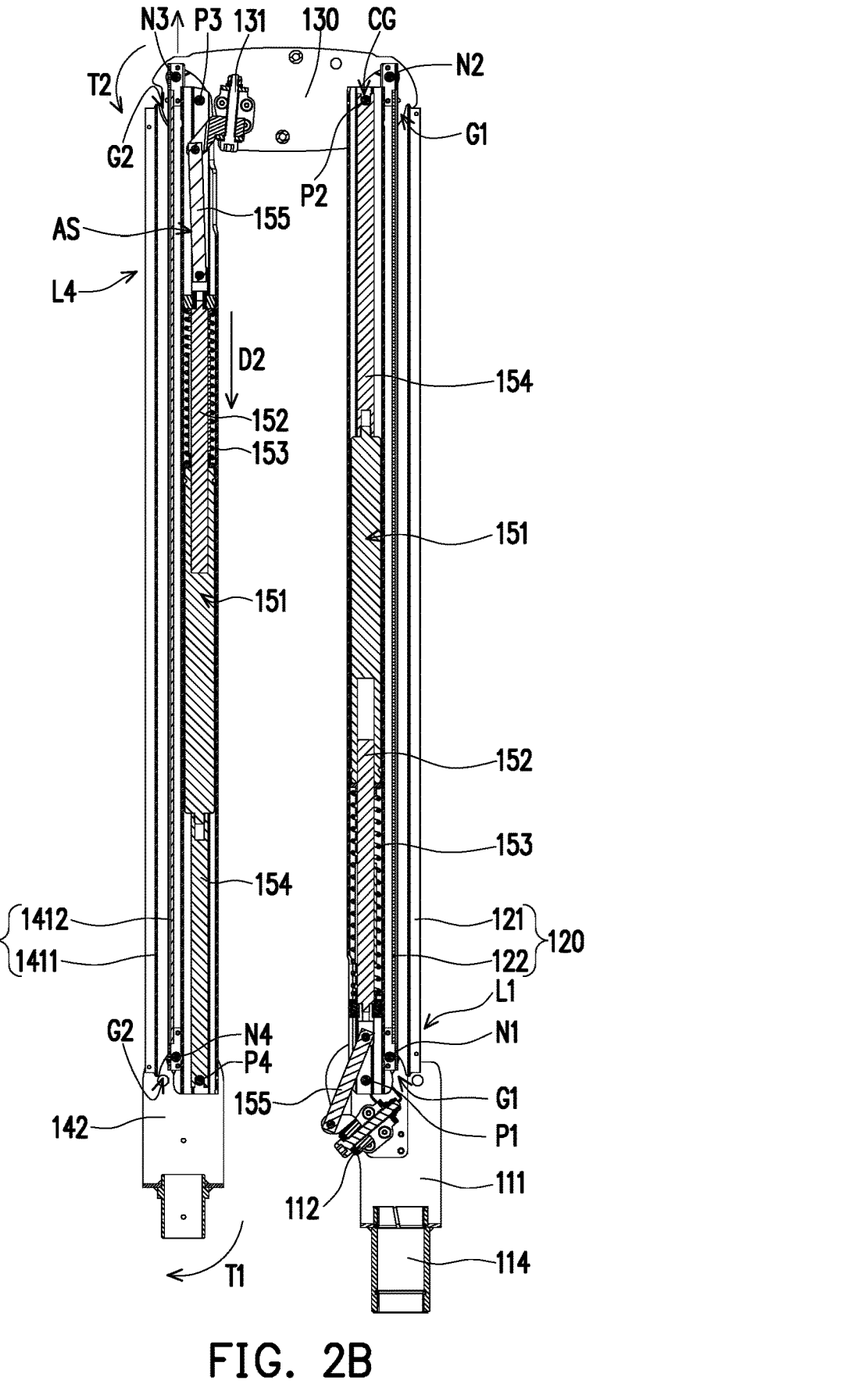
FIG. 2B is a cross-sectional view of a switching action of the supporting device of FIG. 2A.
Figure 2C:
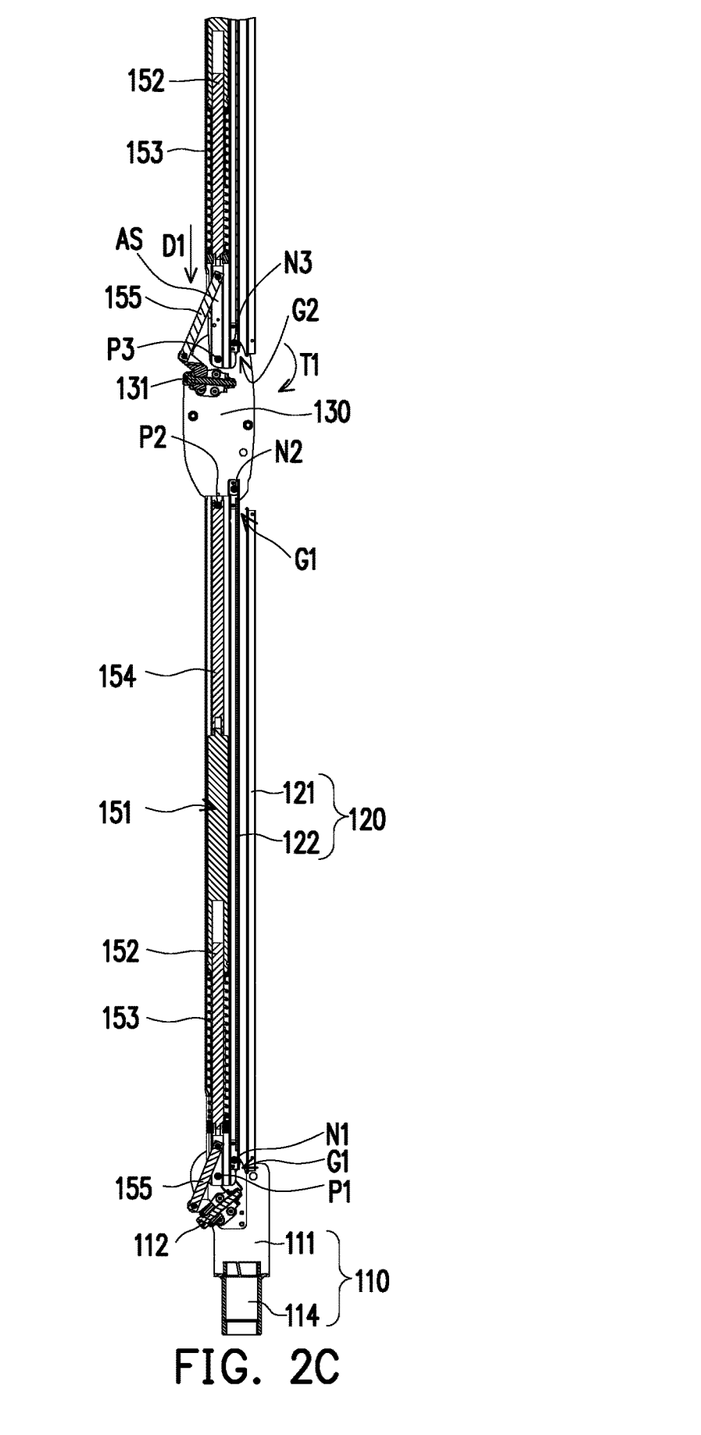
FIG. 2C is a cross-sectional view of another switching action of the supporting device of FIG. 2A.

FIG. 2A is a cross-sectional view of the supporting device of FIG. 1A. FIG. 2B is a cross-sectional view of a switching action of the supporting device of FIG. 2A. FIG. 2C is a cross-sectional view of another switching action of the supporting device of FIG. 2A.

Refer to FIG. 1A, FIG. 1B, and FIG. 2A. The installation assembly 110 has a first bracket 111, a first torque member 112, a first shaft 113, and an installation base 114. The first bracket 111 is pivotally connected to the first end E1 of the first supporting arm assembly 120. The first torque member 112 is disposed in the first bracket 111 and is adapted to push the piston rod 152. The first shaft 113 is disposed through the bottom surface of the first bracket 111. The installation base 114 is rotatably disposed around the first shaft 113 and is located below the first bracket 111.

In detail, the first supporting arm assembly 120 includes a first rotating arm 121 and a first sliding arm 122. The first rotating arm 121 is pivotally connected to the first bracket 111 and the switching bracket 130 through a first pivot P1 and a second pivot P2, respectively. The first rotating arm 121 has an accommodating space AS and a sliding space MS. The gas spring 150 is located in the accommodating space AS. The first sliding arm 122 is slidably located in the sliding space MS and is connected to the first bracket 111 and the switching bracket 130 through a first eccentric shaft N1 and a second eccentric shaft N2.

Further, two ends of the first rotating arm 121 are formed with two first arced grooves G1. The first eccentric shaft N1 and the second eccentric shaft N2 are respectively located in the two first arced grooves G1. When the first sliding arm 122 slides relative to the first rotating arm 121, the first eccentric shaft N1 enters the corresponding first arced groove G1 and the second eccentric shaft N2 is located outside the other corresponding first arced groove G1. Alternatively, the first eccentric shaft N1 is located outside the corresponding first arced groove G1 and the second eccentric shaft N2 enters the other corresponding first arced groove G1.

The gas spring 150 further includes a top rod 154 and a push rod 155. The top rod 154 is connected to the hollow tube 151 and extends straight toward the switching bracket 130. Also, the top rod 154 has a groove CG to accommodate the second pivot P2. The hollow tube 151 is positioned in the accommodating space AS of the first rotating arm 121 through the top rod 154 and the second pivot P2 abutting against each other. The push rod 155 is connected to the piston rod 152 and is pivotally connected to the first torque member 112.

Refer to FIG. 1A, FIG. 1C, and FIG. 2A. The bearing unit 140 includes a second supporting arm assembly 141, a second bracket 142, a second shaft 143, and a bearing base 144.

The second supporting arm assembly 141 has a second longitudinal direction LD2, a first end E1, and a second end E2. The first end E1 is pivotally connected to the switching bracket 130 and is adjacent to the second end E2 of the first supporting arm assembly 120, meaning that the second supporting arm assembly 141 may be pivotally rotated relative to the switching bracket 130 with the third axis AX3 as the center. The first end E1 of the second supporting arm assembly 141 is adapted to rotate relative to the switching bracket 130 to switch to an upright mode or a horizontal mode, so as to be parallel or perpendicular to the first supporting arm assembly 120.

The second bracket 142 is pivotally connected to the second end E2 of the second supporting arm assembly 141, meaning that the second bracket 142 may be pivotally rotated relative to the second supporting arm assembly 141 with a fourth axis AX4 as the center. The second shaft 143 is disposed through the bottom surface of the second bracket 142. The bearing base 144 is rotatably disposed around the second shaft 143 and is located below the second bracket 142.

Another gas spring 150a is disposed in the second supporting arm assembly 141 and is respectively connected to the switching bracket 130 and the second bracket 142 to provide a supporting force. A second torque member 131 is disposed in the switching bracket 130 and is adapted to push a piston rod 152 of the other gas spring 150a.

The second supporting arm assembly 141 has a second rotating arm 1411 and a second sliding arm 1412. The second rotating arm 1411 is respectively connected to the switching bracket 130 and the second bracket 142 through a third pivot P3 and a fourth pivot P4. The second rotating arm 1411 has an accommodating space AS and a sliding space MS. The other gas spring 150a is located in the accommodating space AS. The second sliding arm 1412 is slidably located in the sliding space MS and is connected to the switching bracket 130 and the second bracket 142 through a third eccentric axis N3 and a fourth eccentric axis N4.

Further, two ends of the second rotating arm 1411 are formed with two second arced grooves G2. The third eccentric shaft N3 and the fourth eccentric shaft N4 are respectively located in the two second arced grooves G2. When the second slide arm 1412 slides relative to the second rotating arm 1411, the third eccentric shaft N3 enters the corresponding second arced groove G2 and the fourth eccentric shaft N4 is located outside the other corresponding second arced groove G2. Alternatively, the third eccentric shaft N3 is located outside the corresponding second arced groove G2 and the fourth eccentric shaft N4 enters the other corresponding second arced groove G2.

The top rod 154 of the other gas spring 150a is connected to the hollow tube 151 and extends straight toward the second bracket 142. The top rod 154 has a groove CG to accommodate the fourth pivot P4. The hollow tube 151 is positioned in the accommodating space AS of the second rotating arm 1411 through the top rod 154 and the fourth pivot P4 abutting against each other. The push rod 155 is connected to the piston rod 152 and is pivotally connected to the second torque member 131.

Figure 3A:
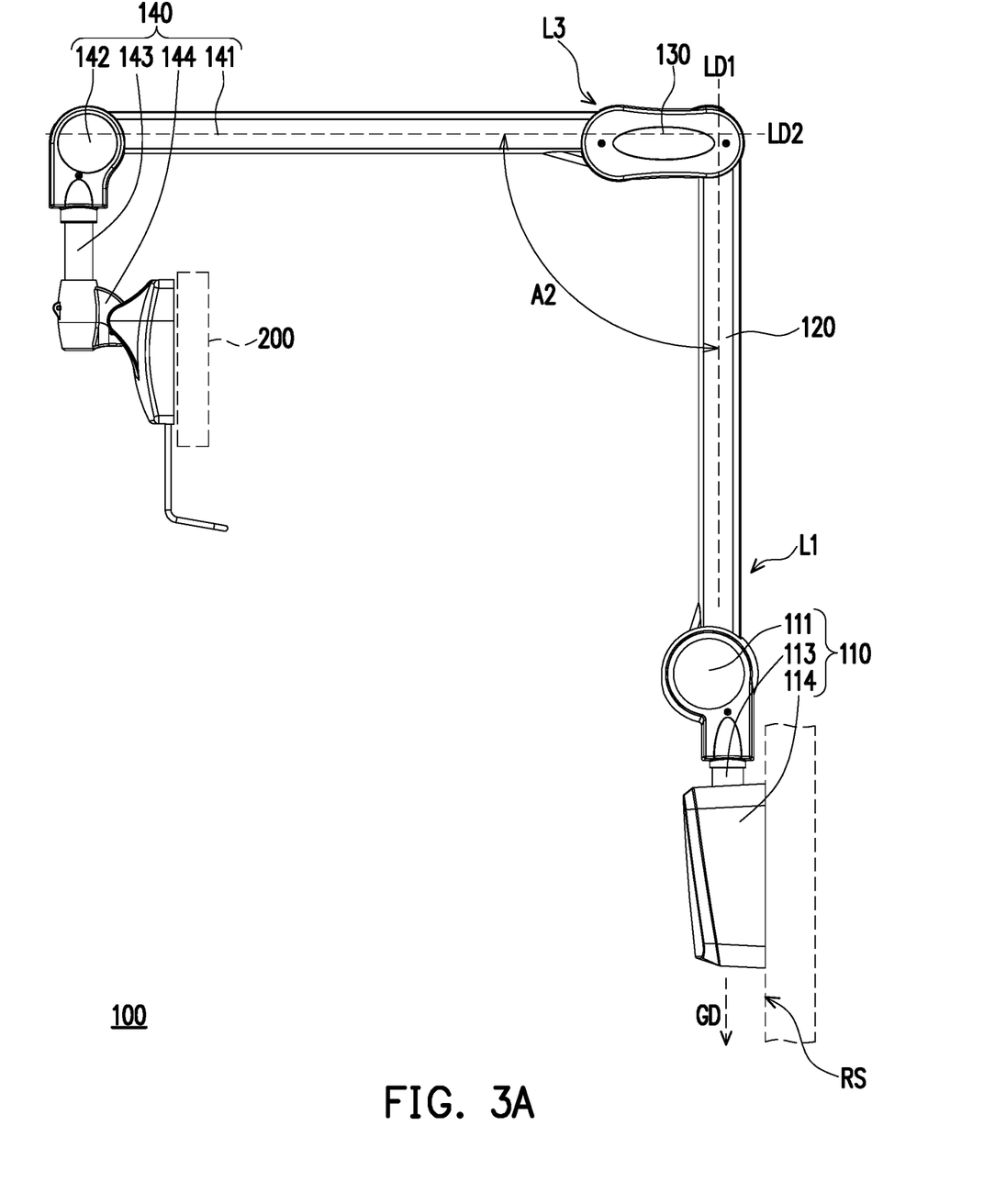
FIG. 3A is a side view of the supporting device of FIG. 1A switched to an angle of 90 degrees.
Figure 3B:
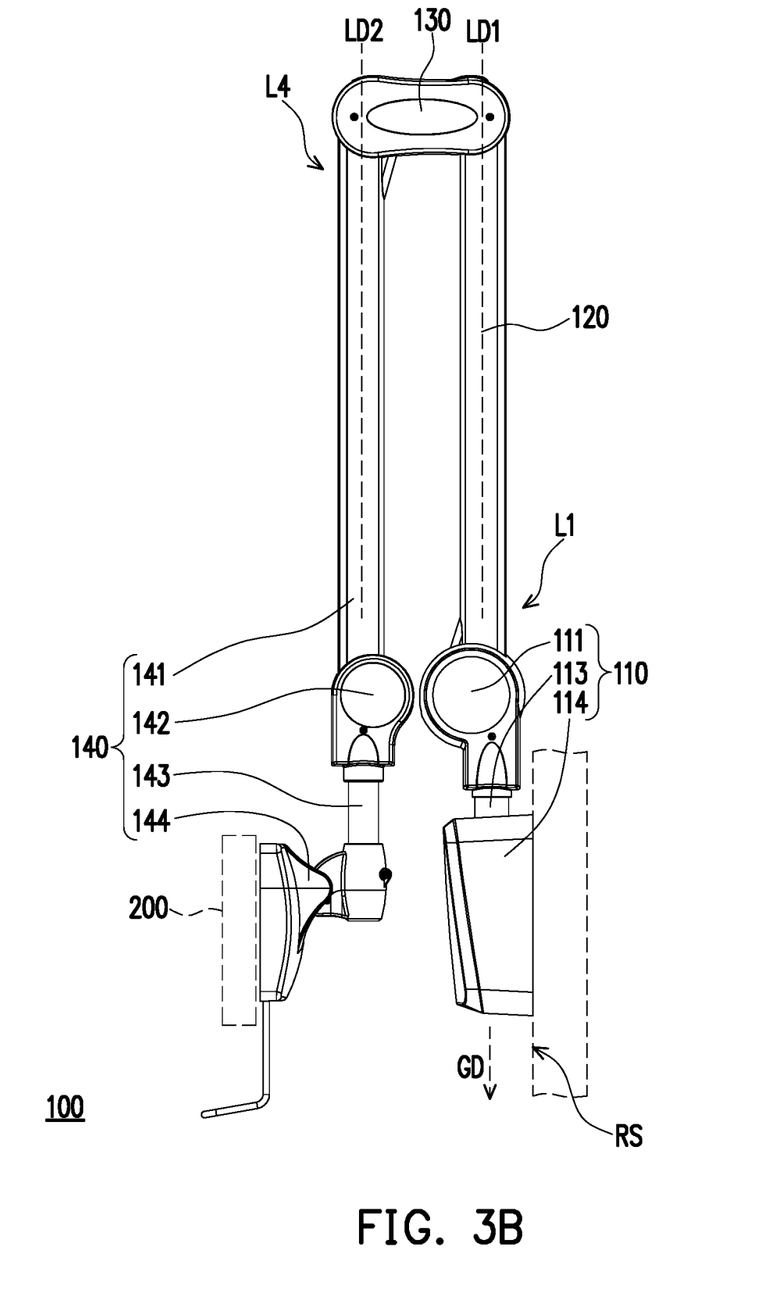
FIG. 3B is a side view of the supporting device of FIG. 1A switched to be mutually parallel.
Figure 3C:
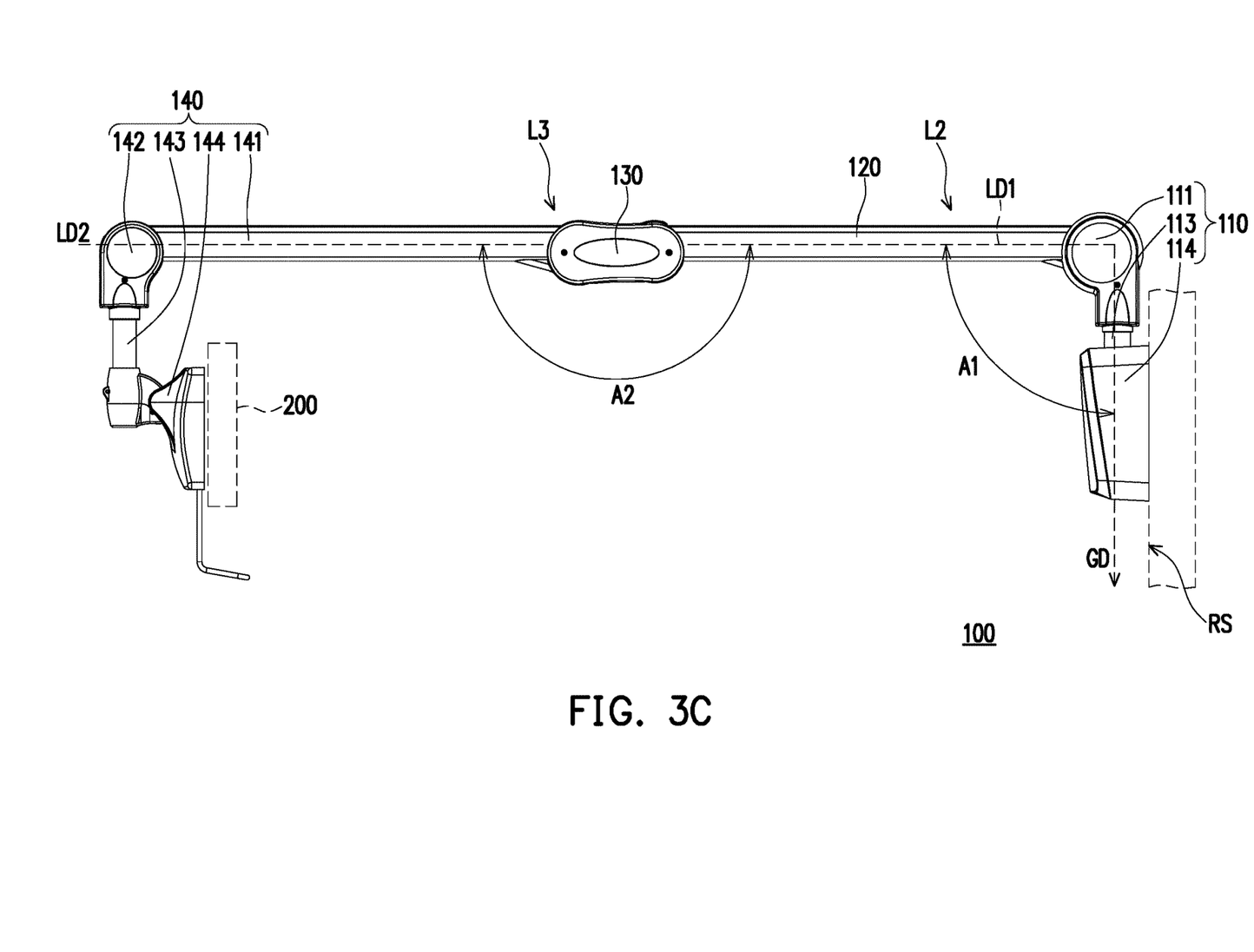
FIG. 3C is a side view of the supporting device of FIG. 1A switched to an angle of 180 degrees.
Figure 3D:
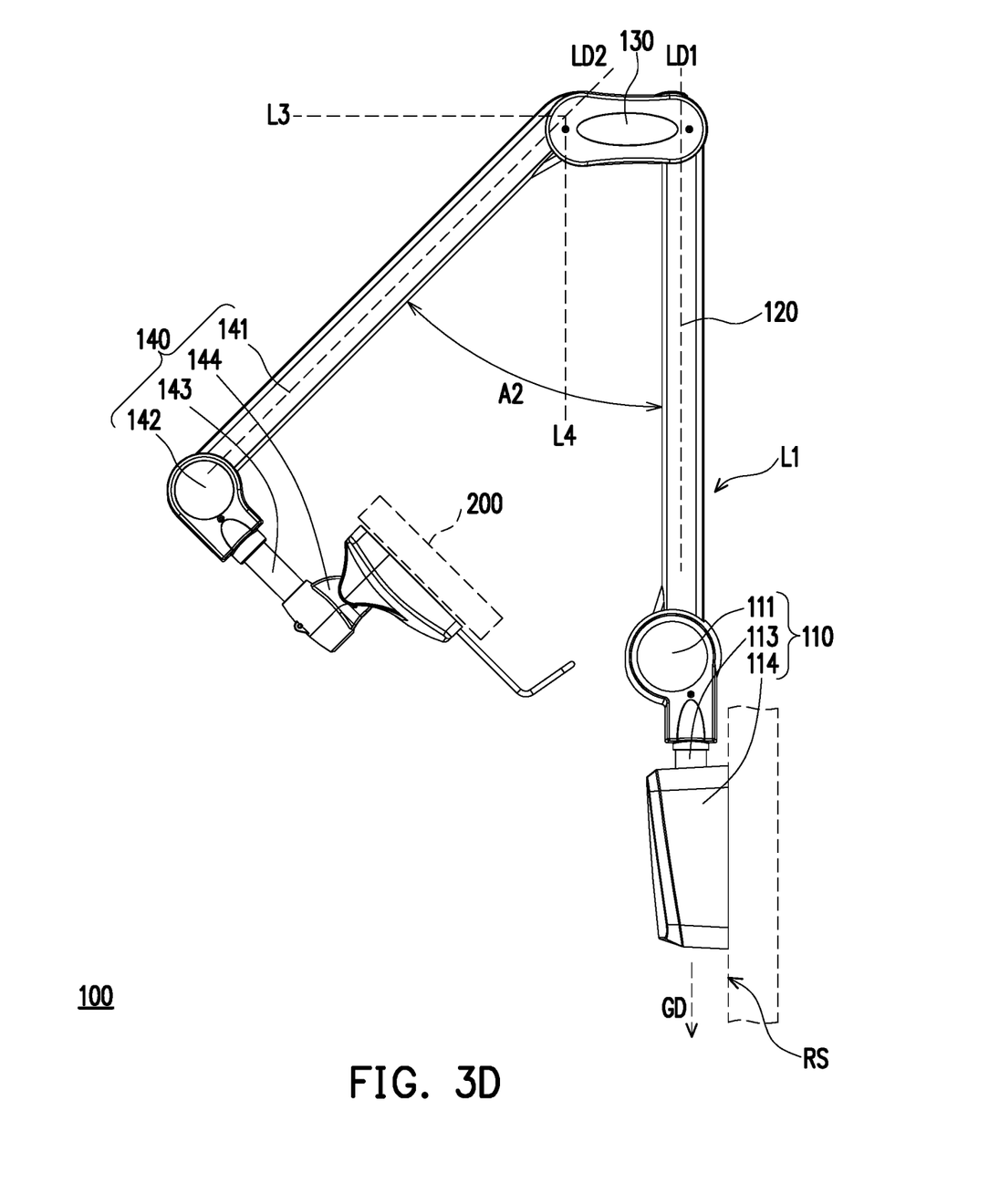
FIG. 3D is a side view of the supporting device of FIG. 1A switched to an angle of 45 degrees.

FIG. 3A is a side view of the supporting device of FIG. 1A switched to an angle of 90 degrees. FIG. 3B is a side view of the supporting device of FIG. 1A switched to be mutually parallel. FIG. 3C is a side view of the supporting device of FIG. 1A switched to an angle of 180 degrees. FIG. 3D is a side view of the supporting device of FIG. 1A switched to an angle of 45 degrees.

Please refer to FIG. 2B and FIG. 3A, the first end E1 of the first supporting arm assembly 120 is rotated relative to the installation assembly 110 and is adapted to move between a first location L1 and a second location L2, wherein the first location L1 is defined as the first supporting arm assembly 120 and the installation assembly 110 connected in a straight line (that is, the first supporting arm assembly 120 is at a high point), and the second location L2 is defined as the first supporting arm assembly 120 and the installation assembly 110 perpendicular to each other (that is, the first supporting arm assembly 120 is at a low point). When the first supporting arm assembly 120 moves to the first location L1 (see FIG. 3A), the first longitudinal direction LD1 is parallel to a gravitational direction GD and the deformation of the compression spring 153 is minimum. When the first supporting arm assembly 120 moves to the second location L2 (see FIG. 3C), the second longitudinal direction LD2 is parallel to the gravitational direction GD and the deformation of the compression spring 153 is maximum.

Further, when the first supporting arm assembly 120 moves from the first location L1 to the second location L2, a first angle A1 of the first longitudinal direction LD1 and the gravitational direction GD gradually decreases to 90 degrees and the push rod 155 is rotated relative to the first torque member 112 and pushes the piston rod 152 into the hollow tube 151, so as to gradually compress the compression spring 153 and accumulate an elastic force. When the first supporting arm assembly 120 moves from the second location L2 to the first location L1, the first angle A1 of the first longitudinal direction LD1 and the gravitational direction GD gradually increases to 180 degrees and the push rod 155 is rotated relative to the first torque member 112 and drives the piston rod 152 to extend from the hollow tube 151. At the same time, the compression spring 153 gradually restores elasticity and assists in pushing the piston rod 152 to return to the original position.

Refer to FIG. 2A and FIG. 2B, the first end E1 of the second supporting arm assembly 141 is rotated relative to the switching bracket 130 and is adapted to move between a third location L3 and a fourth location L4. When the second supporting arm assembly 141 moves to the third location L3, the second longitudinal direction LD2 is perpendicular or parallel to the gravitational direction GD and the deformation of the compression spring 153 is minimum. When the second supporting arm assembly 141 moves to the fourth location L4, the second longitudinal direction LD2 is parallel or perpendicular to the gravitational direction GD and the deformation of the compression spring 153 is maximum.

Further, when the second supporting arm assembly 141 moves from the third location L3 to the fourth location L4, a second angle A2 of the second longitudinal direction LD2 and the first longitudinal direction LD1 gradually decreases, and the push rod 155 is rotated relative to the second torque member 131 and pushes the piston rod 152 into the hollow tube 151, so as to gradually compress the compression spring 153. When the second supporting arm assembly 141 moves from the fourth location L4 to the third location L3, the second angle A2 of the second longitudinal direction LD2 and the first longitudinal direction LD1 gradually increases, and the push rod 155 is rotated relative to the second torque member 131 and drives the piston rod 152 to extend from the hollow tube 151. At the same time, the compression spring 153 gradually restores elasticity. Please refer to FIG. 2A and FIG. 2B, the action processes of the supporting device 100 and the bearing unit 140 during rotation will be briefly explained below.

Refer to FIG. 2A. The second supporting arm assembly 141 is rotated toward a first rotating direction T1 and is connected in a straight line with the switching bracket 130, and the push rod 155 is pushed by the piston rod 152 and the compression spring 153 along the first direction D1, so that the push rod 155 is pivotally rotated relative to the second torque member 131 and protrudes outside the accommodating space AS of the second rotating arm 121. Under such state, the gas spring 150a provides a supporting force to maintain the horizontal mode of the second supporting arm assembly 141. The second bracket 142 is rotated toward the second rotating direction T2 and is perpendicular to the second supporting arm assembly 141. The second bracket 142 drives the second sliding arm 1412 to slide relative to the second rotating arm 1411, so that the fourth eccentric shaft N4 leaves the second arced groove G2 and the third eccentric shaft N3 enters the other second arced groove G2.

Further, refer to FIG. 3A. When the supporting device 100 is switched to an angle of 90 degrees, the second supporting arm assembly 141 and the switching bracket 130 are connected in a straight line and are perpendicular to the first supporting arm assembly 120. Also, the second bracket 142 and the bearing base 144 are perpendicular to the second supporting arm assembly 141. Specifically, when the second angle A2 of the first longitudinal direction LD1 and the second longitudinal direction LD2 is 90 degrees, the first supporting arm assembly 120 is rotated to the first location L1 relative to the installation assembly 110 and the second supporting arm assembly 141 is rotated to the third location L3 relative to the switching bracket 130. In another embodiment (not shown), the first supporting arm assembly 120 is rotated to the second location L2 relative to the installation assembly 110 and the second supporting arm assembly 141 is rotated to the third location L3 relative to the switching bracket 130.

Please refer to FIG. 2B. The second supporting arm assembly 141 is rotated toward the second rotating direction T2 and is perpendicular to the switching bracket 130, so that the push rod 155 is pivotally rotated relative to the second torque member 131 and enters the accommodating space AS of the second rotating arm 1411. As such, the push rod 155 pushes the piston rod 152 and the compression spring 153 along the second direction D2, allowing the piston rod 152a and the compression spring 153 to be compressed and to accumulate elastic force. Under such state, the second supporting arm assembly 141 is switched to the upright mode. The second bracket 142 is rotated toward the first rotating direction T1 and is connected in a straight line with the second supporting arm assembly 141, and the second bracket 142 drives the second sliding arm 1412 to slide relative to the second rotating arm 1411, so that the fourth eccentric shaft N4 enters the second arced groove G2 and the third eccentric shaft N3 leaves the second arced groove G2.

Further, refer to FIG. 3B. When the supporting device 100 is switched to an accommodating state, the second supporting arm assembly 141 is perpendicular to the switching bracket 130 and is parallel to the first supporting arm assembly 120. Also, the second bracket 142 and the bearing base 144 are connected in a straight line with the second supporting arm assembly 141. When the first longitudinal direction LD1 and the second longitudinal direction LD2 are parallel to each other, the first supporting arm assembly 120 is rotated to the first location L1 relative to the installation assembly 110 and the second supporting arm assembly 141 is rotated to the fourth location L4 relative to the switching bracket 130.

Refer to FIG. 3C. When the supporting device 100 is switched to an angle of 180 degrees, the first supporting arm assembly 120 is perpendicular to the first bracket 111 of the installation assembly 110 to become a horizontal mode and is connected in a straight line to the second supporting arm assembly 141 and the switching bracket 130. Also, the second bracket 142 and the bearing base 144 are perpendicular to the second supporting arm assembly 141.

In addition, when the second angle A2 of the first longitudinal direction LD1 and the second longitudinal direction LD2 is 180 degrees and the first angle A1 of the first longitudinal direction LD1 and the gravitational direction GD is 90 degrees, the deformation of the compression spring 153 in the first supporting arm assembly 120 is maximum (refer to FIG. 2A) and the deformation of the compression spring 153 in the second supporting arm assembly 141 is minimum.

Refer to FIG. 2C. In another embodiment, when the second angle A2 of the first longitudinal direction LD1 and the second longitudinal direction LD2 is 180 degrees and the first angle of the first longitudinal direction LD1 and the gravitational direction GD is 180 degrees, the deformation of the compression spring 153 in the first supporting arm assembly 120 is minimum and the deformation of the compression spring 153 in the second supporting arm assembly 141 is minimum.

Refer to FIG. 3D. In another embodiment, when the second angle of the first longitudinal direction LD1 and the second longitudinal direction LD2 is 45 degrees, the second supporting arm assembly 141 is rotated to between the third location L3 and the fourth location L4 relative to the switching bracket 130.

In addition, the rotating movement method of the first supporting arm assembly 120 and the rotating movement method of the second supporting arm assembly 141 above are the same, which will not be reiterated below.

Figure 4A:
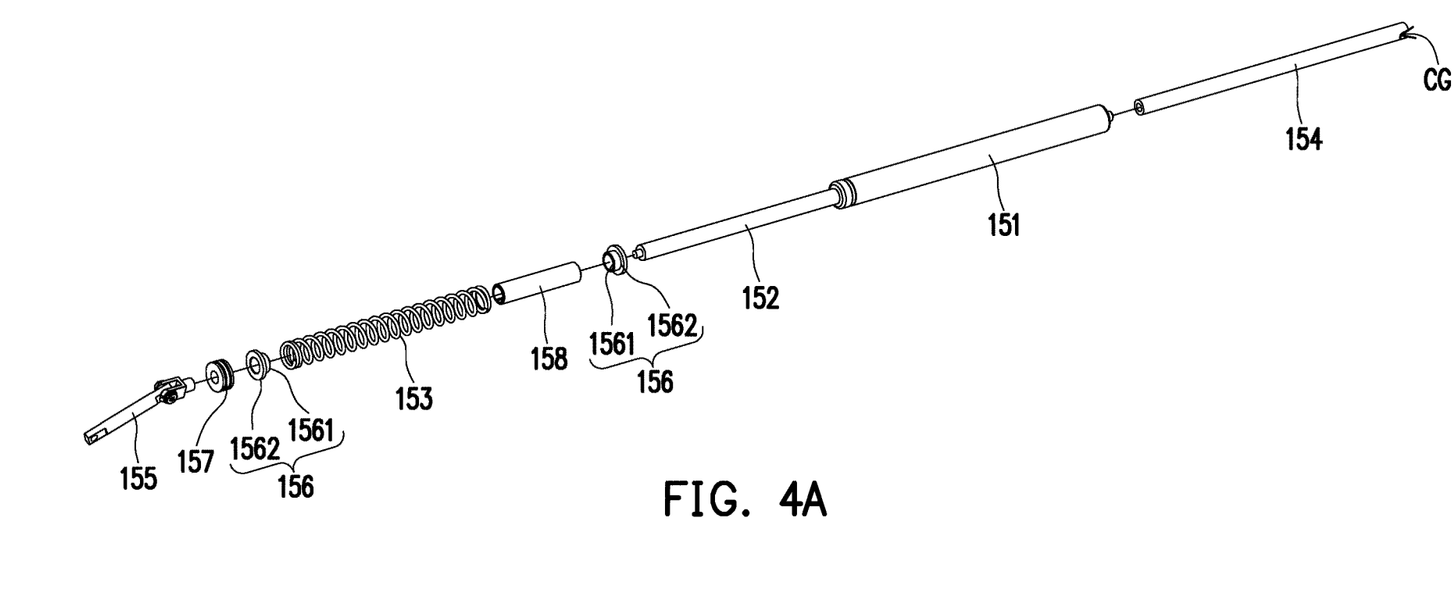
FIG. 4A is an exploded view of elements of a gas spring of the supporting device of FIG. 1C.
Figure 4B:
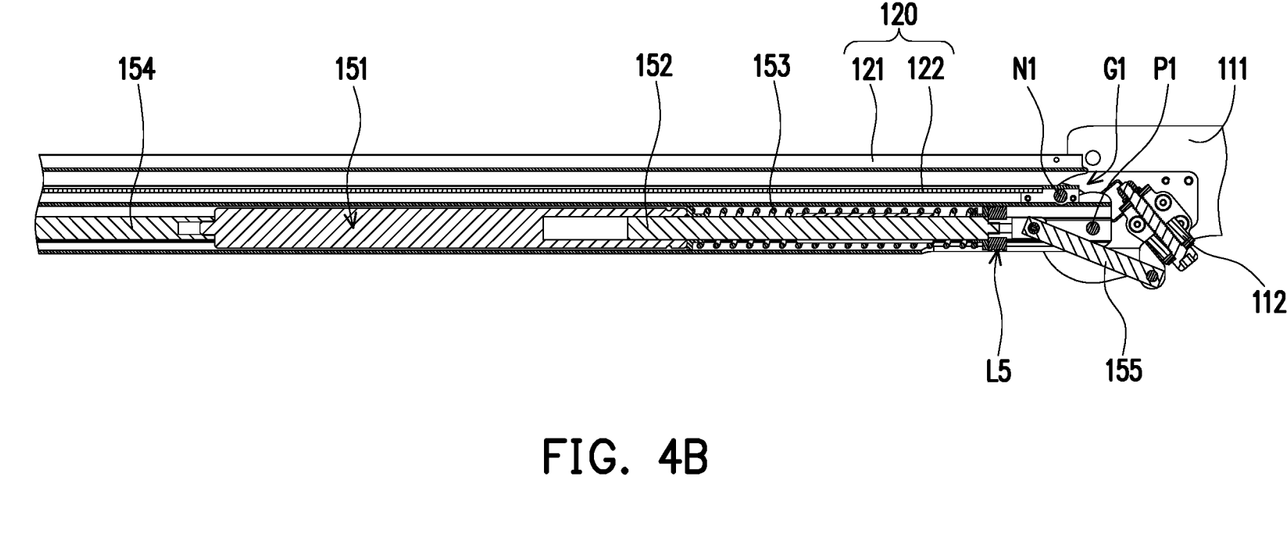
FIG. 4B is a cross-sectional view of the gas spring of FIG. 4A varied to a maximum protruding position.
Figure 4C:
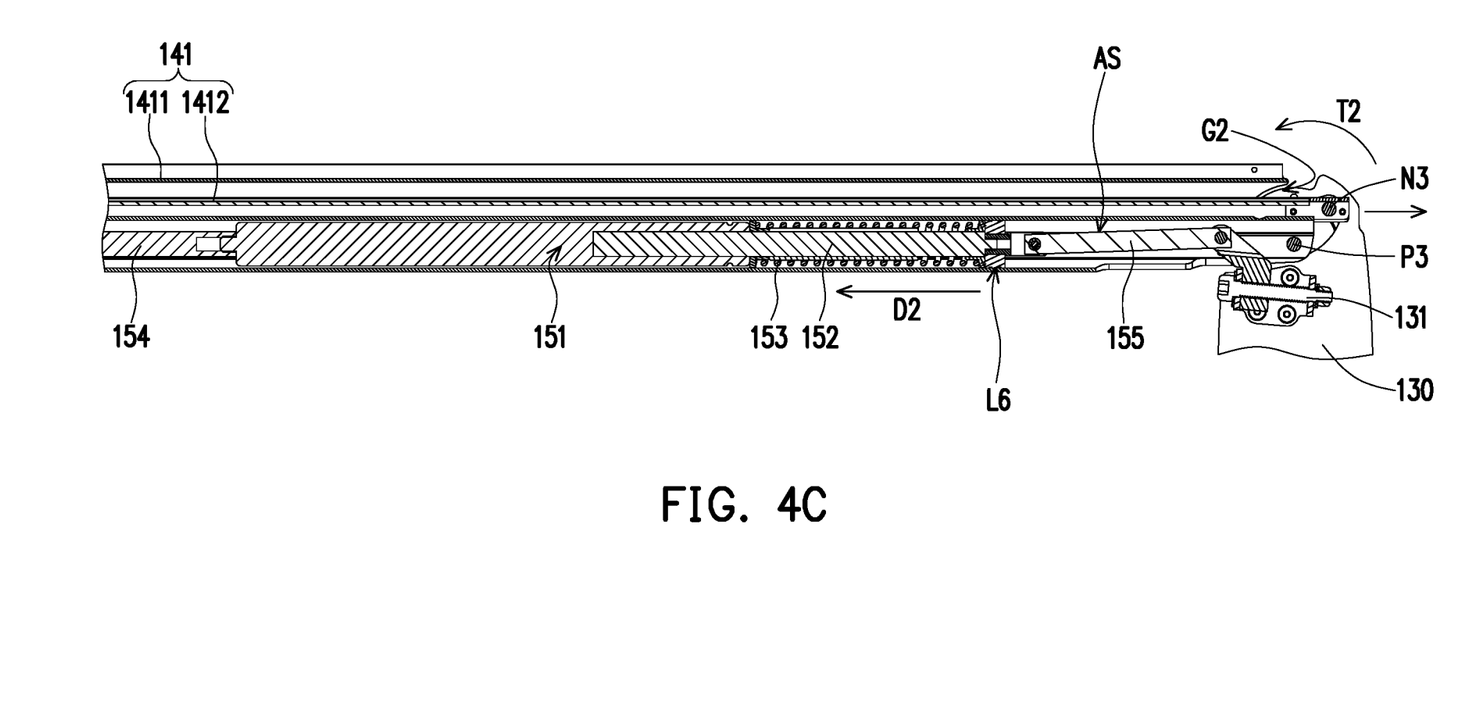
FIG. 4C is a cross-sectional view of the gas spring of FIG. 4A varied to a minimum protruding position.

FIG. 4A is an exploded view of elements of a gas spring of the supporting device of FIG. 1C. FIG. 4B is a cross-sectional view of the gas spring of FIG. 4A varied to a maximum protruding position. FIG. 4C is a cross-sectional view of the gas spring of FIG. 4A varied to a minimum protruding position.

Please refer to FIG. 4A to FIG. 4C. The piston rod 152 is slidably disposed through the hollow tube 151 and has a head. The head may be varied between a maximum protruding position L5 and a minimum protruding position L6 relative to the hollow tube 151. As such, a variable movement space may be defined between the head and the hollow tube 151. In addition, when the head is varied to the maximum protruding position L5, the deformation of the compression spring 153 is minimum. When the head is varied to the minimum protruding position L6, the deformation of the compression spring 153 is maximum.

The compression springs 153 respectively abuts against the hollow tube 151 and the head, and is located in the movement space. A radial cross-sectional area of the compression spring 153 is smaller than a radial cross-sectional area of the hollow tube 151, meaning that the compression spring 153 does not cause the volume of the gas spring 150 to increase and can increase the load capacity of the gas spring 150.

Further, please refer to FIG. 1B, FIG. 1C, and FIG. 4A. In the embodiment, each gas spring 150 includes two positioning rings 156 sleeved on the piston rod 152. One of the positioning rings 156 is adjacent to the hollow tube 151 and the other positioning ring 156 is fixed to the head of the piston rod 152 to extend from the hollow tube 151. The compression spring 153 respectively abuts against the two positioning rings 156. In short, the elastic force of the compression spring 153 acts on the piston rod 152 to increase the maximum pressure value of the gas spring 150.

Each positioning ring 156 has a tubular portion 1561 and a blocking portion 1562. Each tubular portion 1561 is disposed around the piston rod 152 and is adapted to relatively slide. Each blocking portion 1562 is formed around the outer wall surface of each tubular portion 1561. The compression spring 153 respectively surrounds the two tubular portions 1561 and respectively abuts against the two blocking portions 1562. Each gas spring 150 also includes a baffle plate 157 connected to the head of the piston rod 152 and abutting against the corresponding positioning ring 156, thereby connecting the corresponding positioning ring 156 and the piston rod 152 as one body.

Each gas spring 150 includes a sleeve 158, which is disposed around the piston rod 152 and abuts against a portion of the compression spring 153 to separate the compression spring 153 and the piston rod 152, thereby preventing the piston rod 152 from interfering or colliding with the compression spring 153 during the expansion process.

Based on the above, the supporting device of the disclosure is combined with the gas spring as a source of supporting force for the first supporting arm assembly. The gas spring also has the compression spring which may provide the elastic force to the piston rod, thereby increasing the pressure value of the gas spring. Therefore, the supporting device of the disclosure can increase the load capacity thereof without increasing the volume of the gas spring and has the advantage of size miniaturization.

Although the disclosure has been disclosed in the above embodiments, the embodiments are not intended to limit the disclosure. It will be apparent to persons skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A supporting device, comprising:
an installation assembly disposed on a reference plane;
a first supporting arm assembly having a first longitudinal direction, a first end, and a second end, wherein the first end is pivotally connected to the installation assembly;
a switching bracket pivotally connected to the second end of the first supporting arm assembly;
a bearing unit pivotally connected to the switching bracket for bearing an object; and
at least one gas spring disposed in the first supporting arm assembly and connected to the switching bracket and the installation assembly to provide a supporting force, wherein each of the at least one gas spring comprises a hollow tube, a piston rod, and a compression spring, the piston rod is slidably disposed through the hollow tube and has a head, the head may be varied between a maximum protruding position and a minimum protruding position relative to the hollow tube, thereby defining a variable movement space between the head relative to the hollow tube, and the compression spring is sleeved on the piston rod, wherein
the first end of the first supporting arm assembly is rotated relative to the installation assembly and is adapted to move between a first location and a second location, when the first supporting arm assembly moves to the first location, the first longitudinal direction is parallel to a gravitational direction and a deformation of the compression spring is minimum, when the first supporting arm assembly moves to the second location, the first longitudinal direction is perpendicular to the gravitational direction and the deformation of the compression spring is maximum, and the bearing unit is adapted to rotate relative to the switching bracket.

2. The supporting device according to claim 1, wherein the compression spring respectively abuts against the hollow tube and the head, and is located in the movement space, and a radial cross-sectional area of the compression spring is smaller than a radial cross-sectional area of the hollow tube.

3. The supporting device according to claim 2, wherein the at least one gas spring further comprises two positioning rings, wherein one of the positioning rings is adjacent to the hollow tube, the other positioning ring is fixed to the head of the piston rod to extend from the hollow tube, and the compression spring respectively abuts against the two positioning rings.

4. The supporting device according to claim 3, wherein each of the positioning rings has a tubular portion and a blocking portion, each of the tubular portions is disposed around the piston rod and is adapted to relatively slide, each of the blocking portions is formed around an outer wall surface of each of the tubular portions, and the compression spring respectively surrounds the two tubular portions and respectively abuts against the two blocking portions.

5. The supporting device according to claim 3, wherein the at least one gas spring further comprises a baffle plate, which is connected to the head of the piston rod and abuts against the other positioning ring.

6. The supporting device according to claim 1, wherein the at least one gas spring further comprises a sleeve, which is disposed around the piston rod and abuts against the compression spring to separate the compression spring and the piston rod.

7. The supporting device according to claim 1, wherein the installation assembly has a first bracket, a first torque member, a first shaft, and an installation base, the first bracket is pivotally connected to the first end of the first supporting arm assembly, the first torque member is disposed in the first bracket and is adapted to push the piston rod, the first shaft is disposed through a bottom surface of the first bracket, and the installation base is rotatably disposed around the first shaft and is located below the first bracket.

8. The supporting device according to claim 7, wherein the first supporting arm assembly has a first rotating arm and a first sliding arm, the first rotating arm is pivotally connected to the first bracket and the switching bracket respectively through a first pivot and a second pivot, the first rotating arm has an accommodating space and a sliding space, the at least one gas spring is located in the accommodating space, the first sliding arm is slidably located in the sliding space and is connected to the first bracket and the switching bracket through a first eccentric shaft and a second eccentric shaft.

9. The supporting device according to claim 7, wherein the at least one gas spring further comprises a top rod and a push rod, the top rod is connected to the hollow tube and extends straight toward the switching bracket, the push rod has a groove to accommodate the second pivot, and the push rod is connected to the piston rod and is pivotally connected to the first torque member.

10. The supporting device according to claim 9, wherein when the first supporting arm assembly moves from the first location to the second location, a first angle of the first longitudinal direction and the gravitational direction is gradually decreased to 90 degrees and the push rod is rotated relative to the first torque member and pushes the piston rod into the hollow tube to gradually compress the compression spring, when the first supporting arm assembly moves from the second location to the first location, the first angle of the first longitudinal direction and the gravitational direction gradually increases to 180 degrees, the push rod is rotated relative to the first torque member and drives the piston rod to extend from the hollow tube while the compression spring gradually restores elasticity.

11. The supporting device according to claim 1, wherein the bearing unit comprises a second supporting arm assembly, a second bracket, a second shaft, and a bearing base, the second supporting arm assembly has a second longitudinal direction, a first end, and a second end, the first end is pivotally connected to the switching bracket, the second bracket is pivotally connected to the second end of the second supporting arm assembly, the second shaft is disposed through a bottom surface of the second bracket, the bearing base is rotatably disposed around the second shaft and is located on below the second bracket, the first end of the second supporting arm assembly is rotated relative to the switching bracket and is adapted to move between a third location and a fourth location.

12. The supporting device according to claim 11, wherein a quantity of the at least one gas spring is two, one of the two gas springs is disposed in the first supporting arm assembly, the other one of the two gas springs is disposed in the second supporting arm assembly and is respectively connected to the switching bracket and the second bracket to provide a supporting force, a second torque member is disposed in the switching bracket and is adapted to push the piston rod of the other gas spring, when the second supporting arm assembly moves to the third location, the second longitudinal direction is perpendicular or parallel to the gravitational direction and the deformation of the compression spring in the second supporting arm assembly is minimum, when the second supporting arm assembly moves to the fourth location, the second longitudinal direction is parallel or perpendicular to the gravitational direction and the deformation of the compression spring in the second supporting arm assembly is maximum.

13. The supporting device according to claim 12, wherein the second supporting arm assembly has a second rotating arm and a second sliding arm, the second rotating arm is pivotally connected to the switching bracket and the second bracket respectively through a third pivot and a fourth pivot, the second rotating arm has an accommodating space and a sliding space, the other gas spring is located in the accommodating space, the second sliding arm is slidably located in the sliding space and is connected to the switching bracket and the second bracket through a third eccentric shaft and a fourth eccentric shaft.

14. The supporting device according to claim 12, wherein the other gas spring further comprises a top rod and a push rod, the top rod is connected to the hollow tube and extends straight toward the second bracket, and the top rod has a groove to accommodate the fourth pivot, the push rod is connected to the piston rod and is pivotally connected to the second torque member.

15. The supporting device according to claim 9, wherein when the second supporting arm assembly moves from the third location to the fourth location, a second angle of the second longitudinal direction and the first longitudinal direction gradually decreases, the push rod is rotated relative to the second torque member and pushes the piston rod into the hollow tube to gradually compress the compression spring, when the second supporting arm assembly moves from the fourth location to the third location, the second angle of the second longitudinal direction and the first longitudinal direction gradually increases, the push rod is rotated relative to the second torque member and drives the piston rod to extend from the hollow tube while the compression spring gradually restores elasticity.

16. The supporting device according to claim 12, wherein when the second angle of the first longitudinal direction and the second longitudinal direction is 90 degrees, the first supporting arm assembly is rotated to the first location relative to the installation assembly and the second supporting arm assembly is rotated to the third location relative to the switching bracket, or the first supporting arm assembly is rotated to the second location relative to the installation assembly and the second supporting arm assembly is rotated to the third location relative to the switching bracket.

17. The supporting device according to claim 12, wherein when the first longitudinal direction and the second longitudinal direction are parallel to each other, the first supporting arm assembly is rotated to the first location relative to the installation assembly and the second supporting arm assembly is rotated to the fourth location relative to the switching bracket.

18. The supporting device according to claim 12, wherein when the second angle of the first longitudinal direction and the second longitudinal direction is 180 degrees and the first angle of the first longitudinal direction and the gravitational direction is 90 degrees, a deformation of the compression spring in the first supporting arm assembly is maximum and the deformation of the compression spring in the second supporting arm assembly is minimum.

19. The supporting device according to claim 12, wherein when the second angle of the first longitudinal direction and the second longitudinal direction is 180 degrees and the first angle of the first longitudinal direction and the gravitational direction is 180 degrees, the deformation of the compression spring in the first supporting arm assembly is minimum and the deformation of the compression spring in the second supporting arm assembly is minimum.

20. The supporting device according to claim 12, wherein when the second angle of the first longitudinal direction and the second longitudinal direction is 45 degrees, the second supporting arm assembly is rotated to between the third location and the fourth location relative to the switching bracket.

* * * * *